United States Patent
Kushida et al.

(10) Patent No.: US 6,624,606 B2
(45) Date of Patent: Sep. 23, 2003

(54) DRIVE CONTROL CIRCUIT FOR THREE-PHASE BRUSHLESS MOTOR, MOTOR-DRIVEN BLOWER AND ELECTRIC VACUUM CLEANER

(75) Inventors: Hiroyuki Kushida, Odawara (JP); Tsuyoshi Takanose, Fuji (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/145,141

(22) Filed: May 15, 2002

(65) Prior Publication Data

US 2002/0185987 A1 Dec. 12, 2002

(30) Foreign Application Priority Data

May 15, 2001 (JP) ......................................... 2001-145267

(51) Int. Cl.[7] ............................ G05B 11/28; H02P 1/26; H02P 1/04
(52) U.S. Cl. ..................... 318/599; 318/778; 318/431
(58) Field of Search ..................... 318/599, 431, 318/778, 272, 277

(56) References Cited

U.S. PATENT DOCUMENTS

| | | | | |
|---|---|---|---|---|
| 4,864,198 A | * | 9/1989 | Takase et al. ............... | 318/254 |
| 5,323,094 A | * | 6/1994 | Kaneda et al. .............. | 318/254 |
| 5,418,436 A | * | 5/1995 | Apuzzo ....................... | 318/497 |
| 5,534,763 A | * | 7/1996 | Williams et al. ............ | 318/799 |
| 5,901,268 A | | 5/1999 | Ando et al. .................. | 388/811 |
| 6,034,494 A | * | 3/2000 | Kitamine et al. ........... | 318/254 |
| 6,218,795 B1 | * | 4/2001 | Syukuri ....................... | 318/254 |
| 6,249,095 B1 | | 6/2001 | Takura ........................ | 318/254 |
| 6,479,956 B1 | * | 11/2002 | Kawabata et al. .......... | 318/254 |
| 2002/0117989 A1 | * | 8/2002 | Kawabata et al. .......... | 318/700 |
| 2003/0042859 A1 | * | 3/2003 | Gorti et al. .................. | 318/275 |

FOREIGN PATENT DOCUMENTS

| | | | | |
|---|---|---|---|---|
| JP | 62-272877 | | 11/1987 | |
| JP | 2001-271759 | * | 10/2001 | ........... F04B/49/06 |

* cited by examiner

*Primary Examiner*—Robert E. Nappi
*Assistant Examiner*—Patrick Miller
(74) *Attorney, Agent, or Firm*—Oblon, Spivak, McClelland, Maier & Neustadt, P.C.

(57) ABSTRACT

The present invention aims to first start the rotation of a rotor according to a first sequence for causing currents to flow in armature windings of three phases U, V and W upon startup of a three-phase brushless motor to thereby reduce an inrush current at the startup thereof, thus making it possible to lighten an electrical load on each electronic part used for control. Also the present invention aims to perform switching to an original second sequence for causing currents to flow in the armature windings of the two phases U and V, V and W or W and U of the three-phase brushless motor after the startup of the three-phase brushless motor to thereby provide a period for an open state of each terminal and make dead band control or the like unnecessary, thus making control of the three-phase brushless motor easier.

6 Claims, 12 Drawing Sheets

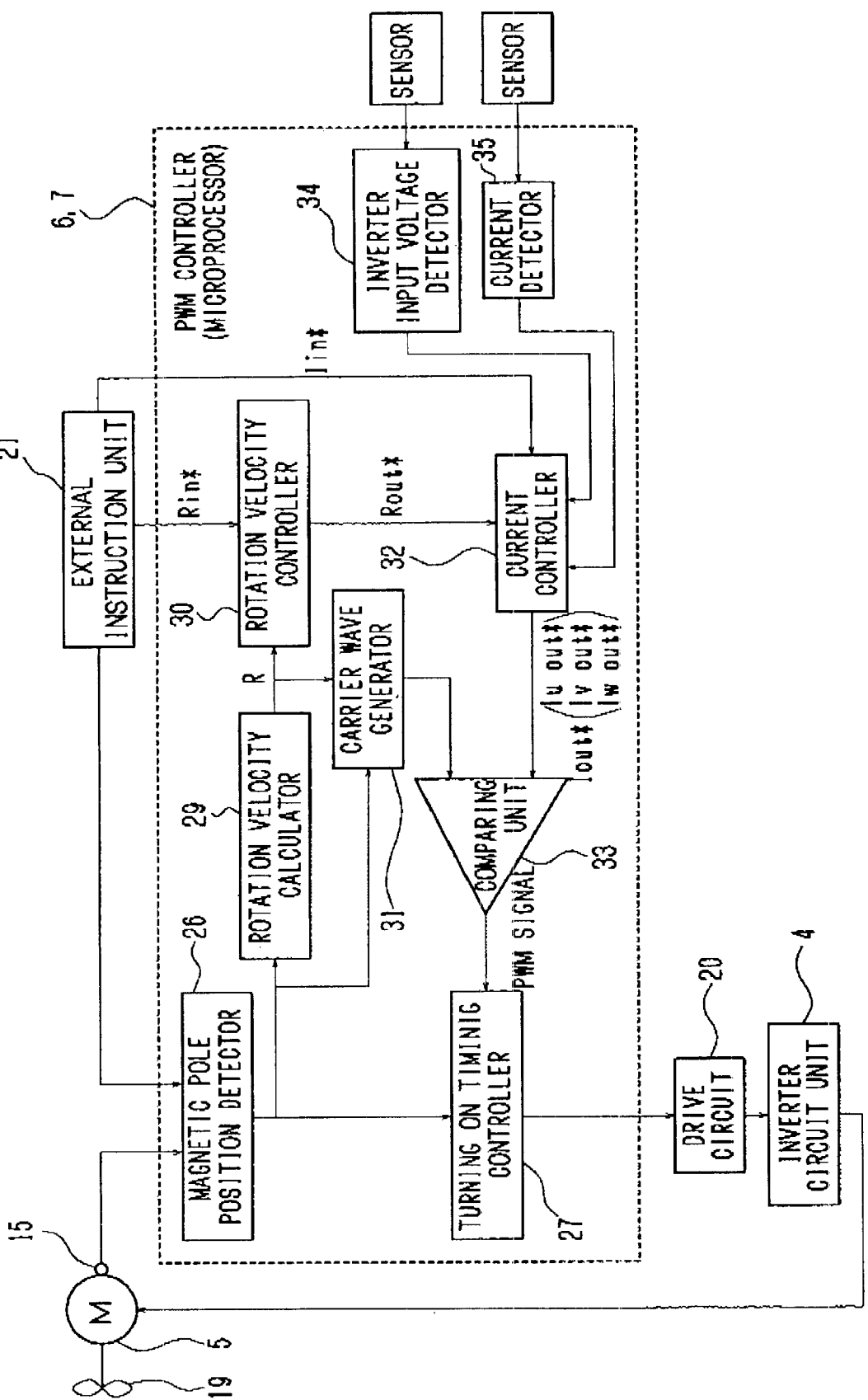

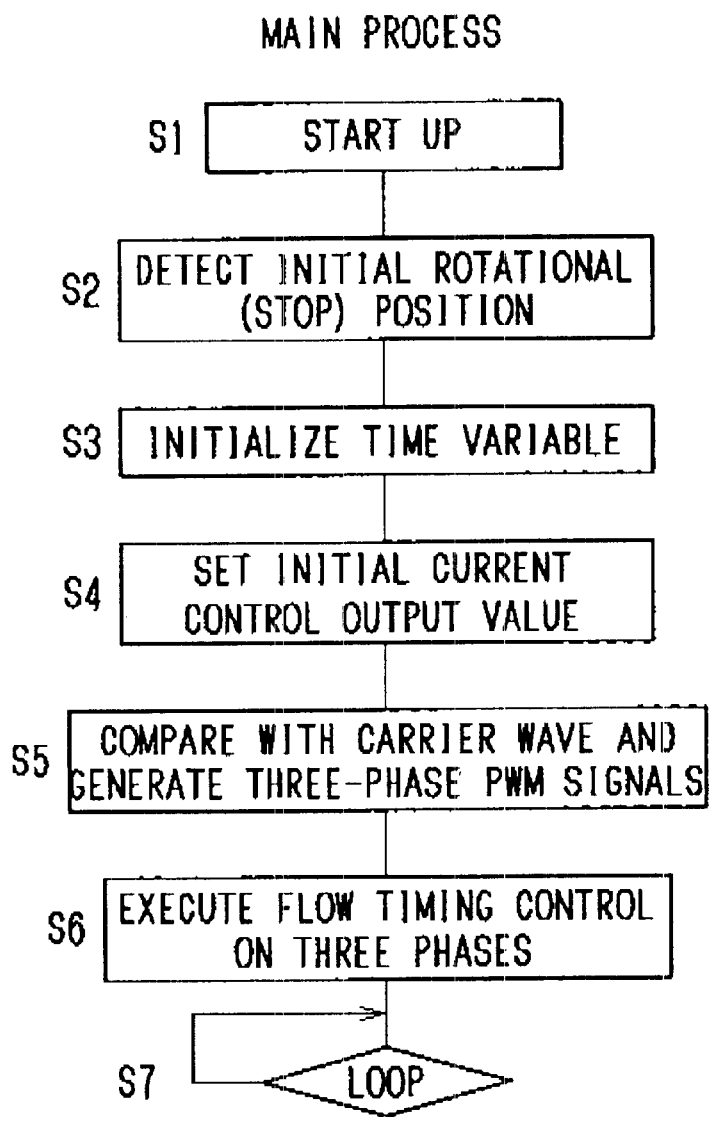

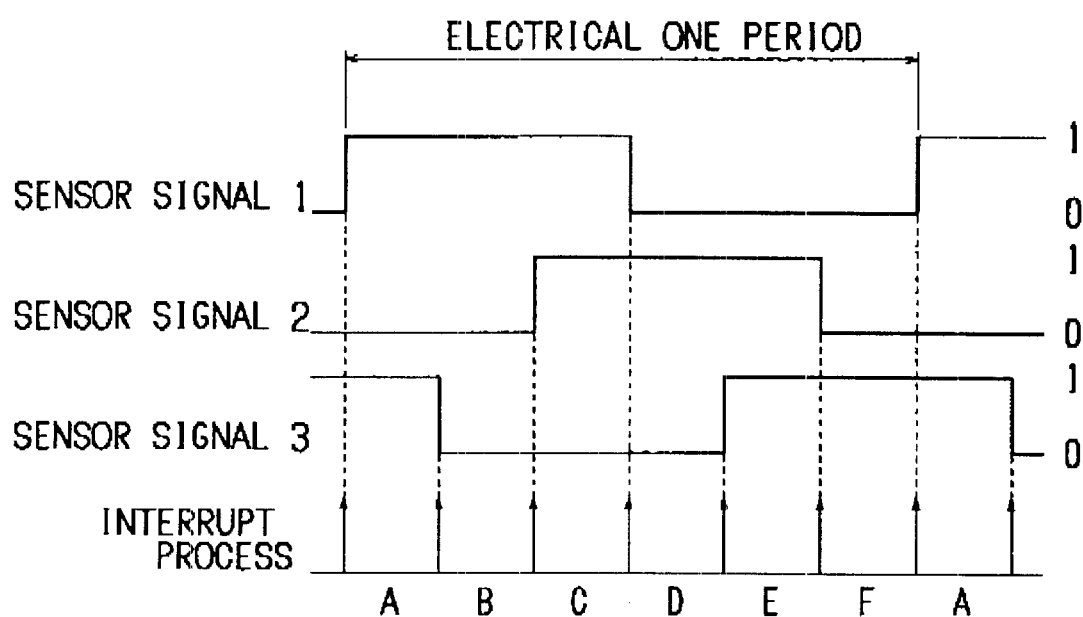

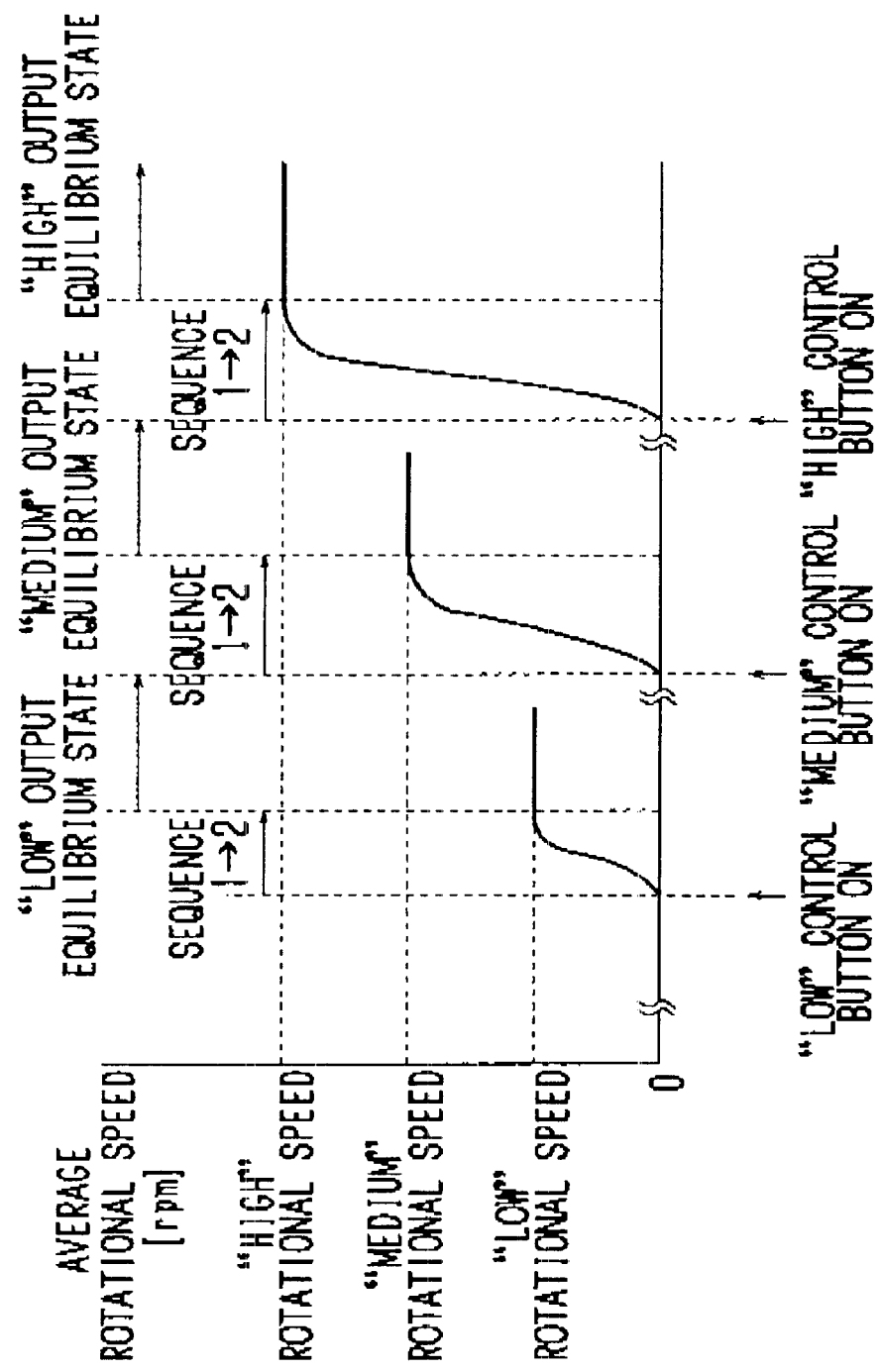

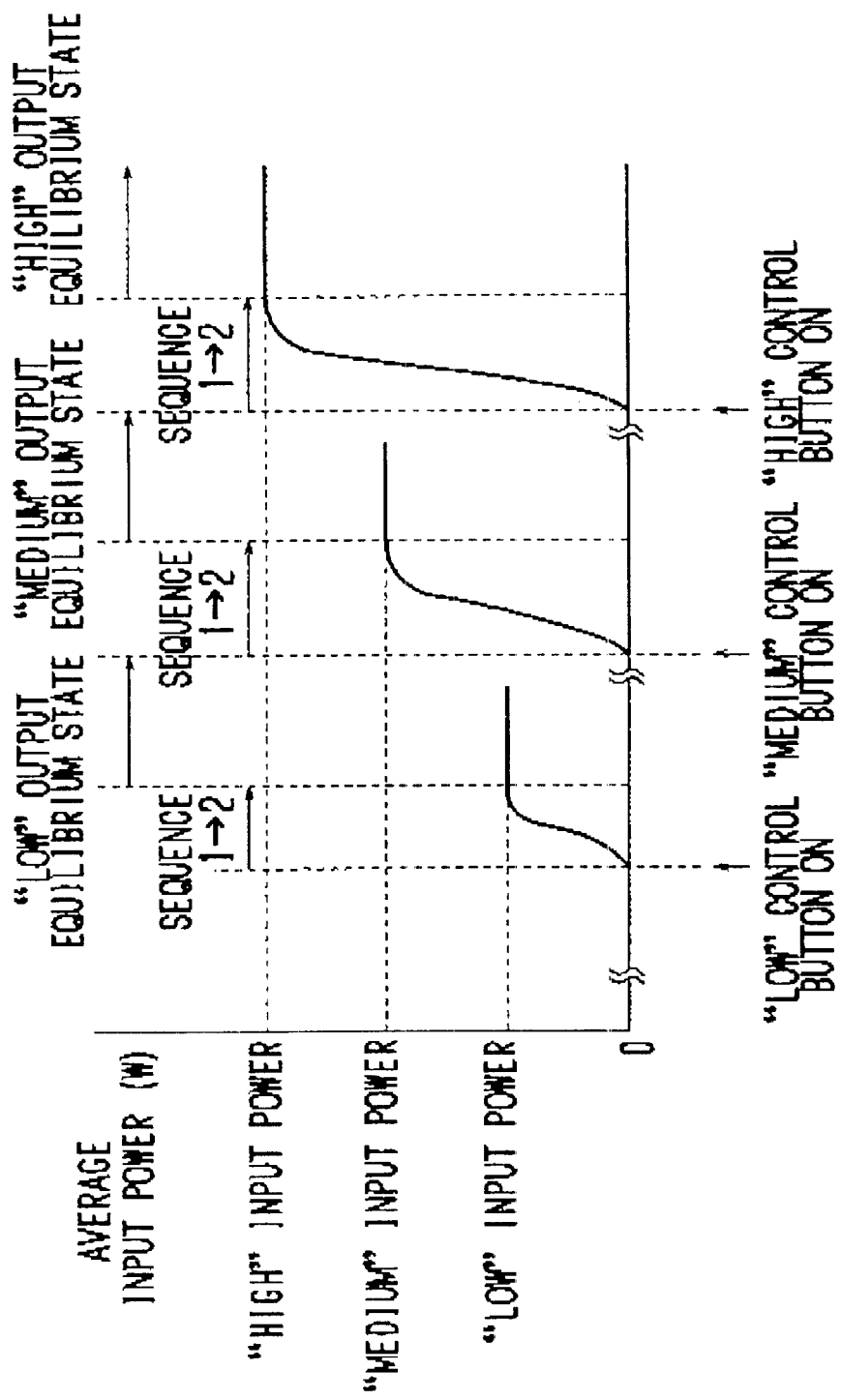

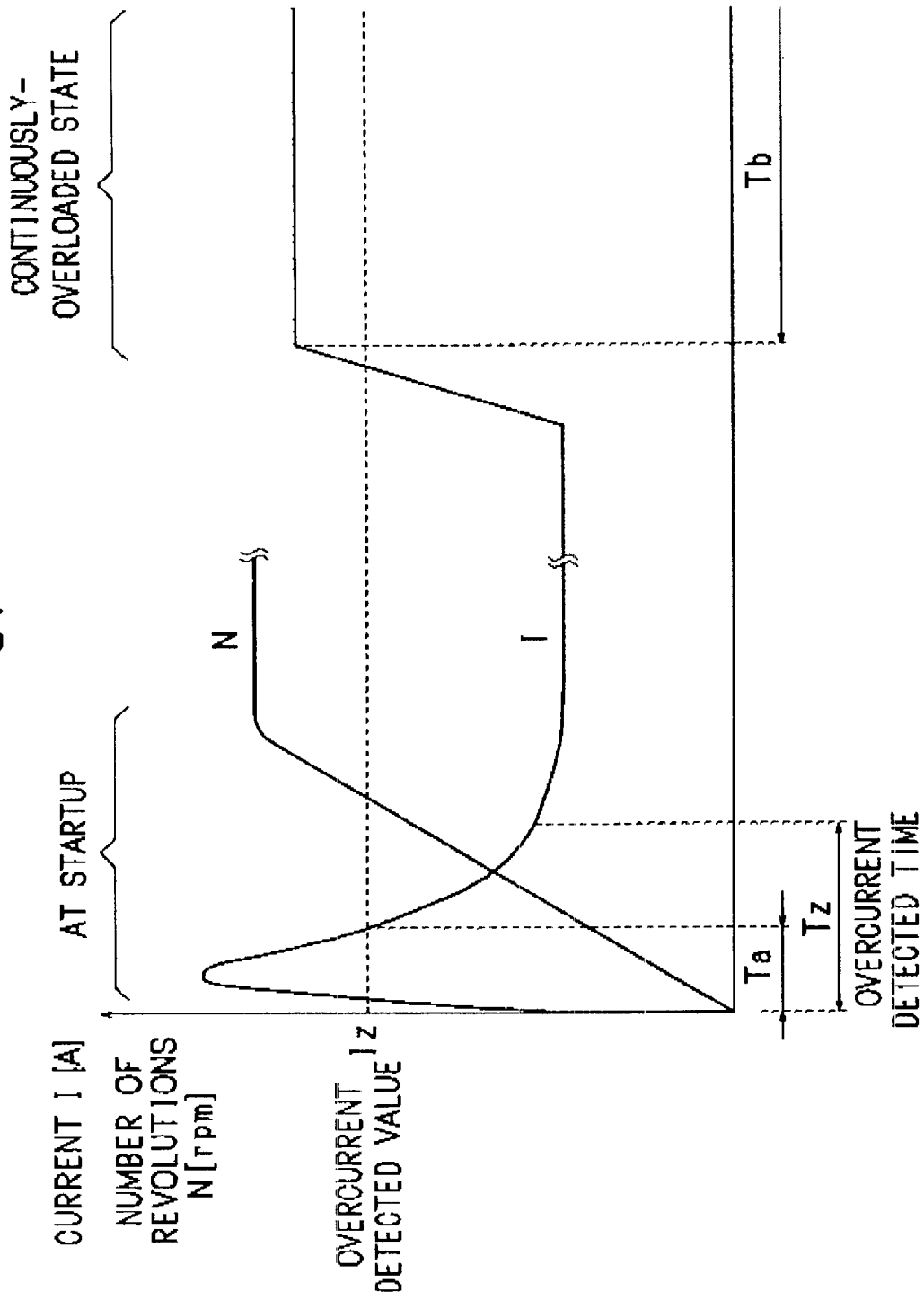

DRIVE CONTROL CIRCUIT FOR THREE-PHASE BRUSHLESS MOTOR, MOTOR-DRIVEN BLOWER AND ELECTRIC VACUUM CLEANER

CROSS REFERENCE TO RELATED APPLICATION

The present application is based on Japanese Priority Document P2001-145267 filed on May 15, 2001, the content of which is incorporated herein by reference.

BACKGROUND OF THE INVENTION

1. Field of the Invention

The present invention relates to a drive control circuit suitable for use in a three-phase brushless motor, a motor-driven blower and an electric vacuum cleaner. The electric vacuum cleaner described herein includes various devices which collect various solids or fluids into a collection area by using negative pressure.

2. Discussion of the Background

As a motor, e.g., a motor-driven blower or the like in which the motor is used, there is known one provided with an overcurrent protection function for discriminating an inrush current and an improper current that flow upon startup of the motor-driven blower or the like. As shown in FIG. 11, the inrush current that flows upon startup of the motor-driven blower is high instantaneously but decreases with time. On the other hand, when an overload is continuously imposed on the motor-driven blower or the motor-driven blower is brought into a lock state, an overcurrent continues to flow. Therefore, if an overcurrent detected value Iz and an overcurrent detected value Tz are set and detected simultaneously then the inrush current and the improper current at the startup can be discriminated. Namely, when Tz<Tb is reached upon Iz<I, the current is recognized as the improper current and cut off. There have heretofore been known various circuit configurations each having such a function.

This method, however, is accompanied by a problem that although the time is exactly short, a large current flows at the startup and a load is imposed on each electronic part on an electrical circuit. There is therefore known a method of suppressing the inrush current at the startup as low as possible; For example, a method disclosed in Unexamined Patent Publication No. Sho 62(1987)-272877 shows that a PWM inverter device outputs a signal having a short pulse width for a predetermined time alone upon its startup and thereby starts up.

When the motor used in the motor-driven blower or the like is made up of a three-phase brushless motor, systems such as sinusoidal drive, 6-step 120° energized drive, 6-step 180° drive, etc. have been adopted as a basic system for inverter driving of the three-phase brushless motor. The sinusoidal drive is one ideal drive system, which is driven so that a voltage applied across a terminal of a motor takes a sinusoidal wave. The sinusoidal drive has been used in applications or the like which requires low vibrations and low noise. Also position detecting means high in resolution are required for accurate drive. The 6-step 120° energized drive is a system often used as a drive system of a brushless motor, wherein a period in which each motor terminal is in an open state, is given as 60°, the waveform of a voltage applied across the motor terminal approximates a trapezoidal wave rather than a rectangular wave, and no torque pulsation is low. Since the 6-step 180° energized drive does not have the period in which each motor terminal is in the open state, it needs dead band control or the like. The waveform of the voltage applied across the motor terminal is basically determined by switching of an inverter circuit and a DC voltage thereof. These drive systems are used properly according to their uses.

However, these related arts are intended to trigger a pulse having a pulse width less than or equal to the maximum trigger protection pulse width which exists in a non-destructive region of a power transistor, as a control signal. They do not disclose specific means other than the use of the pulse width control.

The basic system of the inverter drive of the three-phase brushless motor conventionally used in the motor-driven blower or the like is suitable for such an application that a load at the startup of a motor-driven blower mounted to an electric vacuum cleaner is extremely small and raised in proportion to the square of a rotational speed thereof, and it needs to reach a high rotational speed in a short period of time as in the motor-driven blower mounted to the electric vacuum cleaner, for example. Further, specific means for reducing an inrush current at its startup has not yet been known.

SUMMARY OF THE INVENTION

Accordingly, an object of the present invention is to easily reduce an inrush current flowing at the startup of a three-phase brushless motor upon control of the three-phase brushless motor, particularly to reduce the inrush current at the startup in the form suitable for such an application that a load at the startup is extremely small and it needs to reach a high rotational speed in a short period of time as in a motor-driven blower mounted to an electric vacuum cleaner.

The object of the present invention is achieved by a novel drive control circuit of a three-phase brushless motor, motor-driven blower and electric vacuum cleaner of the present invention.

According to the novel drive control circuit of the three-phase brushless motor, of the present invention, a pulse signal is generated based on a detected signal of rotational position detecting means detecting each rotational position of the three-phase brushless motor to thereby control an inverter circuit which drives the three-phase brushless motor. The drive control circuit or the three-phase brushless motor, of the present invention causes memory to store a first sequence for generating pulse signals for causing currents to flow in armature windings of three phases of the three-phase brushless motor, and a second sequence for generating pulse signals for causing currents to flow in the armature windings of the two phases of the three-phase brushless motor. When the three-phase brushless motor is started up, the drive control circuit generates pulse signals according to the first sequence to control the inverter circuit, thereby reducing an inrush current at the startup, and thereafter performs switching to the second sequence to generate pulse signals, thereby controlling the inverter circuit.

According to the novel motor-driven blower of the present invention, the drive control circuit of the three-phase brushless motor, of the present invention is used.

According to the novel electric vacuum cleaner or the present invention, the motor-driven blower of the present invention is used.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is a function block diagram showing a PWM controller related to control of the motor-driven blower.

FIG. 7 is an explanatory view showing the relationship between signals produced from magnetic sensors and an interrupt process;

FIG. 9 is a timing chart showing the relationship between the average number of revolutions of the motor-driven blower 1 and timings provided to change from a first sequence to a second sequence;

FIG. 10 is a timing chart depicting the relationship between the average input power of the motor-driven blower 1 and timings provided to change from a first sequence to a second sequence; and FIG. 11 is an explanatory view illustrating an inrush current and overcurrent protection in a prior art.

DETAILED DESCRIPTION OF THE PREFERRED EMBODIMENT

An embodiment of the present invention will be described based on FIGS. 1 through 11.

The present embodiment relates to an electric vacuum cleaner and a motor-driven blower used in the electric vacuum cleaner.

[Motor-driven Blower]

A description will first be made of an embodiment in which a drive control circuit of a three-phase brushless motor of the present invention is applied to, for example, a motor used in a motor-driven blower.

Figure 1:
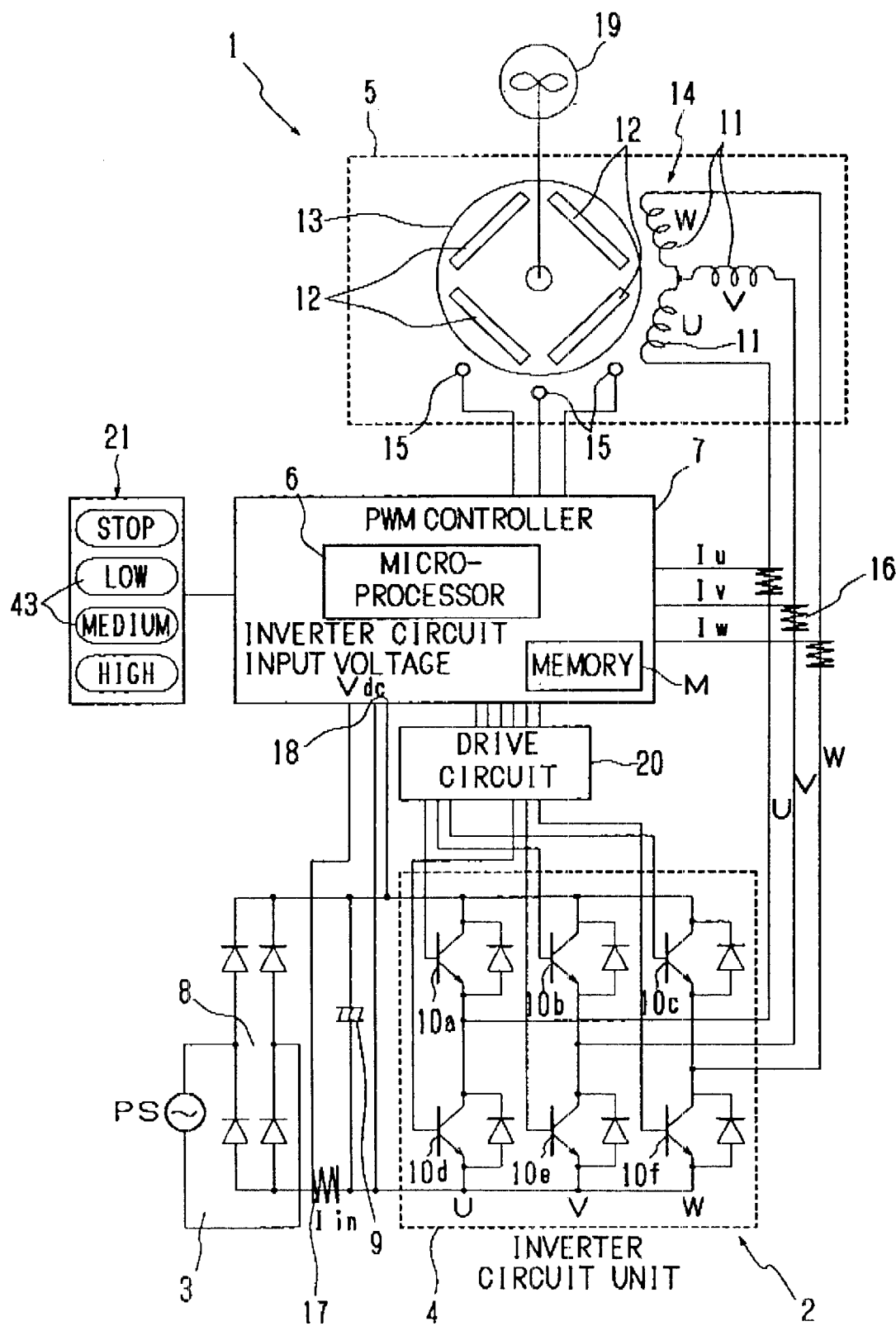
FIG. 1 is a circuit diagram showing a drive control circuit of a motor-driven blower.

FIG. 1 is a circuit diagram showing a drive control circuit 2 of a motor-driven blower 1. The drive control circuit 2 has the principle of operation that a three-phase brushless motor 5 of the motor-driven blower 1 is rotatably driven by a high-frequency current produced from an inverter circuit unit 4 used as an inverter circuit high-frequency driven with a power unit 3 as a drive source. Further, the drive control circuit 2 has such a circuit configuration that the inverter circuit unit 4 is driven and controlled by a PWM controller 7 used as a PWM (Pulse Width Modulation) control circuit including a microprocessor 6. The details of the respective parts or components will be explained below.

In the power unit 3, an AC voltage generated from a commercial AC source PS is converted to a DC voltage under rectifying and smoothing effects of a rectifier circuit 8 and a smoothing capacitor 9, followed by supply to the inverter circuit unit 4 in such a DC voltage mode or form. However, the DC voltage may be directly supplied from a DC power supply such as a battery to the inverter circuit unit 4.

The inverter circuit unit 4 has a configuration wherein six semiconductor switching elements 10a through 10f, e.g., power transistors are connected in a three-phase bridge form, and diodes are respectively connected in parallel with the power transistors. The inverter circuit unit 4 is controlled based on a PWM signal as a pulse signal, which is outputted from the PWM controller 7 with the microprocessor 6 as a main body and supplies an AC current to each of armature windings 11 of the motor 5.

The three-phase brushless motor 5 includes a rotor 13 in which permanent magnets 12 provided in two-pole pairs are embedded, and a stator 14 having a plurality of the armature windings 11. A core of the rotor 13 is made up of silicon steel or the like having high permeability.

Now the drive control circuit 2 of the motor-driven blower 1 is provided with rotor position detecting means (rotational position detecting means) 15 for detecting rotational or angular positions of the rotor 13. As such rotor position detecting means 15, three magnetic sensors installed at intervals of 120 electrical degrees are used. As the magnetic sensors, may be mentioned, a hole sensor, a hole IC, etc. Upon implementation thereof, a means using an optical pulse encoder, a means for detecting a voltage induced in the corresponding armature winding 11 during a turning off (current-noncarrying) period by a voltage phase detecting means, etc. are available as other rotor position detecting means 15. A structure is adopted wherein such rotor position detecting means 15 detect magnetic pole positions every predetermined intervals of the rotor 13, and the microprocessor 6 of the PWM controller 7 computes the rotation velocity of the rotor 13 and conduction or turning on timings provided for the respective phases by use of the magnetic pole positions indicative of their detected signals, and supplies currents to the armature windings 11 of the stator 14 so as to obtain desired torque, thereby generating a revolving field.

The drive control circuit 2 of the motor-driven blower 1 is also provided with an armature current detecting means 16 for detecting currents that flow through the armature windings 11 of the three-phase brushless motor 5. The armature current detecting means 16 is configured as a detecting means for detecting a current flowing through each armature winding 11 in the three-phase brushless motor 5. Such an armature current detecting means 16 comprises three current sensors for respectively detecting currents Iu, Iv and Iw flowing through the armature windings of the respective phases of U, V and W, and a circuit for detecting voltages applied across three resistors by means of the PWM controller 7.

Further, the drive control circuit 2 of the motor-driven blower 1 includes an inverter circuit current detecting means 17 for detecting a current Iin flowing through the inverter circuit unit 4, and an inverter circuit input voltage detecting means 18 for detecting a voltage Vdc inputted to the inverter circuit unit 4 both of which are used as means different from the above means, for detecting the currents flowing through the armature windings 11. The inverter circuit current detecting means 17 is configured as a physical quantity detecting means for detecting the current Iin flowing through the inverter circuit unit 4, which is used as a means different from the above means for detecting the currents flowing through the armature windings 11. Such an inverter circuit current detecting means 17 comprises a current sensor, or such a circuit that a voltage applied across a resistor interposed and connected between the rectifier circuit 8 and the smoothing capacitor 9 is detected by means of the PWM controller 7.

The inverter circuit input voltage detecting means 18 is configured as a physical quantity detecting means for detecting the voltage Vdc inputted to the inverter circuit unit 4. Such an inverter circuit input voltage detecting means 18 comprises such a circuit that the voltage Vdc rectified and smoothed by the rectifier circuit 8 and the smoothing capacitor 9 and inputted to the inverter circuit unit 4 is detected by the PWM controller 7.

Figure 2A:
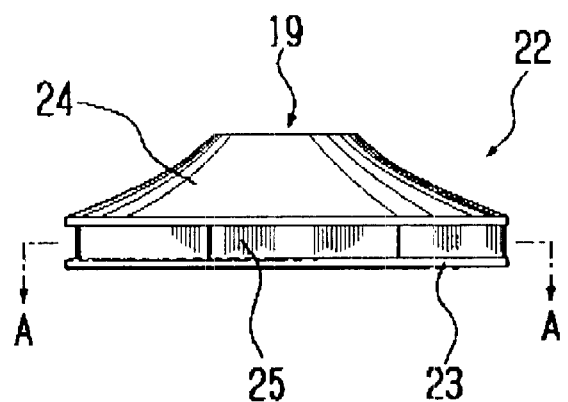
FIG. 2(A) is a front view illustrating an outline of an impeller of a centrifugal air blower.
Figure 2B:
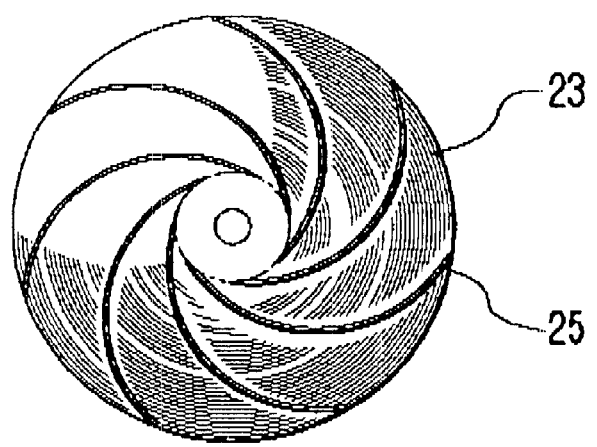
FIG. 2(B) is a cross-sectional view taken along line A~A in FIG. 2(A)

FIG. 2 is a schematic diagram showing the form of an impeller 22 of the centrifugal air blower 19. The centrifugal air blower has heretofore been in wide use as one used for the electric vacuum cleaner. The impeller 22 comprises a main plate 23, a side plate 24 and a plurality of vanes or blades 25. The vanes 25 have a plurality of convex portions formed thereon, which are respectively fit and fastened up in their corresponding holes defined in the main plate 23 and the side plate 24 and fixed therein.

A description will next be made of control of the three-phase brushless motor 5 by the PWM controller 7. A description will be made here of control sharing the use of the hardware configuration of the motor-driven blower 1 referred to above.

FIG. 3 is a function block diagram related to the motor-driven blower 1 according to the present embodiment. The microprocessor 6 included in the PWM controller 7 is a microcomputer (not shown) comprising a CPU for executing various computing processes and concentratedly controlling respective parts, and various memories M. The microprocessor 6 executes a predetermined computing process and an input/output process of various signals in accordance with operation programs stored in the memories M used as storage units to thereby control the respective parts. The function block diagram shown in FIG. 3 mainly illustrates the function of such a microprocessor 6 in the form of a block diagram.

On the basis of an instruction issued from an external instruction unit 21, the PWM controller 7 basically detects magnetic pole positions of the rotor 13 of the three-phase brushless motor 5 in the motor-driven blower 1, offers timing provided to supply a current to each phase and outputs a PWM signal.

As functional elements constituting such a PWM controller 7, the PWM controller 7 includes detectors 26, 34 and 35 for respectively detecting physical quantities related to the motor-driven blower 1, such as magnetic pole positions of the rotor 13, a voltage and each current inputted to the inverter circuit, etc., a turning on timing controller 27, a rotation velocity calculator 29, a rotation velocity controller 30, a current controller 32, a carrier wave generator 31, and a comparing unit 33. They are processed by the microprocessor 6. Further, they may be processed by software. The advantage or the software processing resides in that the function of the PWM controller can be easily changed according to uses of the motor-driven blower 1 without changing hardware.

A basic function of the PWM controller 7 is as follows. The current controller 32 generates a current control output value Iout*, based on a current instruction value Iin* supplied from the external instruction unit 21 and detected values of the physical quantities related to the motor-driven blower 1, and inputs the current control output value Iout* to the comparing unit 33 used as a PWM generating unit for comparison. The comparing unit 33 is supplied with a triangular wave signal from the carrier wave generator 31 as a comparison reference, whereby a PWM signal is taken out or extracted from the output of the comparing unit 33. A suitable PWM signal is generated according to the PWM signal and the turning on timings signal provided to supply the current to each phase, which is supplied from the turning on timing controller 27 on the basis of each detected value of the-magnetic pole position detector 26.

In response to the PWM signal generated in this way, a drive circuit 20 selectively drives and controls the semiconductor switching elements 10a through 10f in the inverter circuit unit 4. Thus, high-frequency voltage outputs are supplied to their corresponding armature windings 11 to drive the three-phase brushless motor 5.

The function of the rotation velocity controller 30 will next be described. The rotation velocity controller 30 compares a rotation-velocity calculated value R calculated from each angle detected by the rotor position detecting means 15 of the rotor 13 and its elapsed time with an upper-limit rotation velocity of the rotor 13, which is determined according to a mechanical strength or the like. When the rotation-velocity calculated value R exceeds the upper-limit rotation velocity, the rotation velocity controller 30 controls the rotation velocity of the rotor 13 so as to be limited to within the upper-limit rotation velocity.

Further, the rotation velocity controller 30 serves as a proportional integral control system, for example. On the basis of the instruction issued from the external instruction unit 21, the microprocessor 6 recognizes various drive modes and subtracts the rotation-velocity calculated value R calculated from each angle detected by the rotor position detecting means 15 of the rotor 13 and its elapsed time from a rotation velocity instruction value Rin* recognized according to each of the drive modes. Thus, a rotation velocity output value Rout* is obtained using an expression like an expression (1) by reference to the result of subtraction thereof.

$$Rout^*_k = Rout^*_{k-1} + Kp(E_k - E_{k-1}) + Ki \cdot T \cdot E_{k-1} \tag{1}$$

In the expression (1), Rout* indicates a rotation velocity output value, E indicates an error between a rotation velocity instruction value Rin* and a rotation-velocity calculated value R, Kp indicates a proportional gain, Ki indicates an integral gain, and T indicates a detection cycle or period of a rotation velocity, respectively. There may be cases in which the rotation velocity control of such a proportional integral control system is not performed depending on applications.

The current controller 32 generates a current control output value Iout*, based on a rotation velocity control output value Rout* supplied from the rotation velocity controller 30 and detected values of physical quantities related to the motor-driven blower 1. The current control output value Iout* is inputted to the comparing unit 33 used as the PWM waveform generating unit for comparison, and a triangular wave signal from the carrier wave generator 31 is supplied thereto as a comparison reference, whereby a PWM waveform is taken out at the output of the comparing unit 33. A PWM signal is generated according to the PWM waveform and each of turning on timings for the respective phases, which is supplied from the turning on timing controller 27.

In response to the generated PWM signal, the drive circuit 20 selectively drives and controls the semiconductor switching elements 10a through 10f in the inverter circuit unit 4 in a manner similar to the above. As a result, high-frequency voltage outputs are supplied to their corresponding armature windings 11 to drive the three-phase brushless motor 5.

In such a configuration, the three-phase brushless motor 5 constituting the motor-driven blower 1 is rotatably driven by each current supplied from the inverter circuit unit 4, so that the impeller 22 is rotated. The motor-driven blower 1 sucks fluid, e.g., air, moisture and water under the rotation of the impeller 22. At this time, the three-phase brushless motor 5 is rotatably driven in an efficient state according to the state of the external instruction unit 21, each rotational or angular position of the rotor 13 of the three-phase brushless motor 5, each current flowing in the inverter circuit unit 4, etc.

Figure 4:
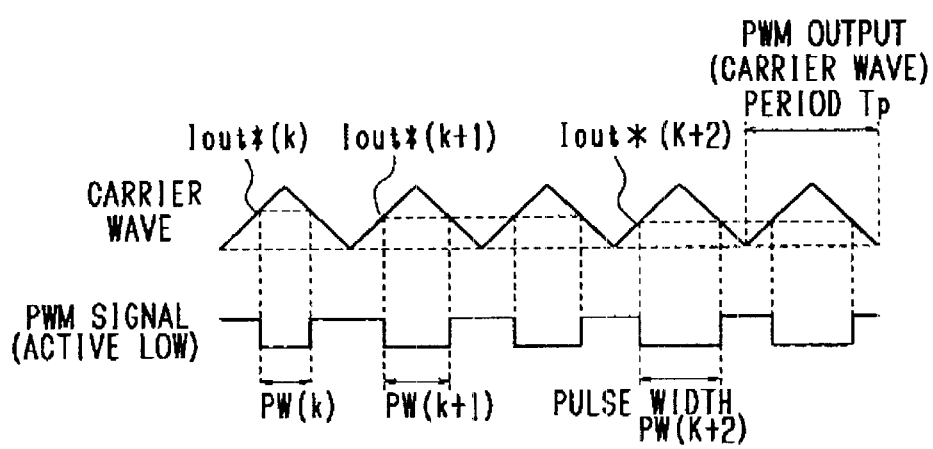
FIG. 4 is a timing chart illustrating a PWM signal and a carrier wave.

FIG. 4 is a timing chart showing the relationship between a carrier wave of PWM, and a PWM signal outputted from the PWM controller 7. The microprocessor 6 generates an interrupt signal in a pre-set period or starts interrupt processing in response to an interrupt signal supplied from the outside with such an external interrupt signal as a trigger. As described above, the microprocessor 6 processes a rotation velocity calculation, rotation velocity control, the detection of each physical quantity, current control, etc. and calculates a current control output value Iout*. The period for the interrupt processing is determined according to the contents of control executed during the interrupt processing, the need for follow-up thereof, etc.

Further, the current control output value Iout* is inputted to the comparing unit 33 used as the PWM generating unit for the purpose of comparison, and a carrier wave of a period Tp is supplied from the carrier wave generator 31 as a comparison reference, whereby a PWM waveform is taken out at the output of the comparing unit 33. When the value of the carrier wave reaches the current control output value Iout* or more in the example illustrated in FIG. 4, the PWM signal is taken active. Accordingly, an output period of the PWM signal also reaches Tp. Thus, the output value of the current controller 32 is reflected on each pulse width and thereby the amount of a current flowing through each armature winding 11 is controlled, whereby the motor-driven blower 1 having a desired output is obtained.

Incidentally, the period Tp of the carrier wave supplied from the carrier wave generator 31 is variable and the value of the carrier wave might-be reset (to zero) with a desired timing. For example, when the value of the carrier wave is reset at the time that an interrupt signal is produced in accordance with each drive mode of the motor-driven blower 1, the number of pulses outputted from the PWM controller 7 can be controlled more accurately.

Figure 5:
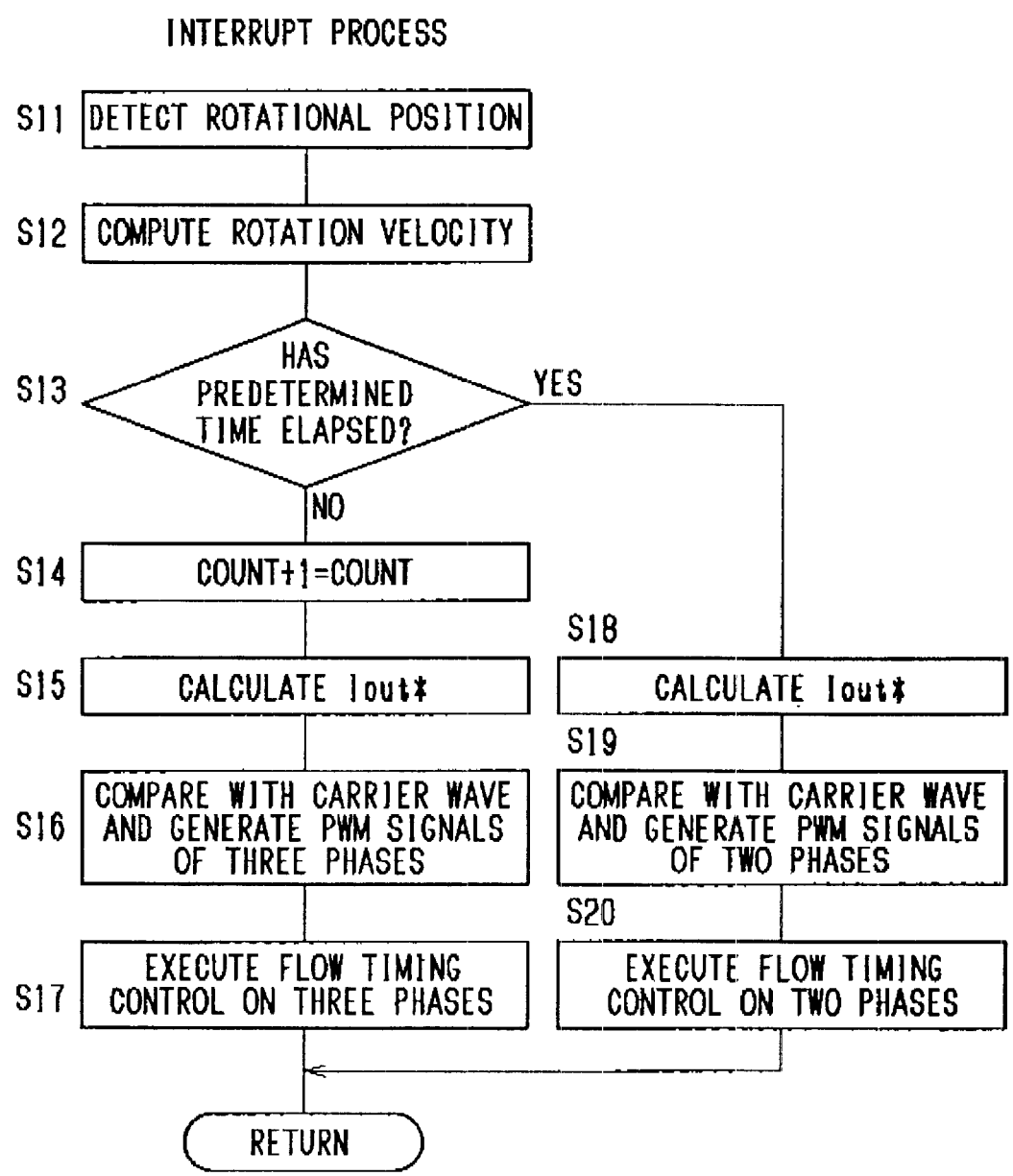
FIG. 5(A) is a flowchart of a main process showing operation of the PWM controller at startup.
FIG. 5(B) is a flowchart of an interrupt process showing operation of the PWM controller at startup.

FIG. 5 is a flowchart for describing main operation of the PWM controller 7 at the startup of the microprocessor 6. Commonly-known control means are used for the setting of various registers and flags, a carrier wave generating method, etc.

Based on an instruction given from the external instruction unit 21 or the like, the PWM controller 7 first detects a stop position of the rotor 13 of the three-phase brushless motor 5 at the startup (Step S1) as shown in FIG. 5(A) (S2). Next, the PWM controller 7 sets an initial value X1 of a current control output value Iout* (S4). Further, the PWM controller 7 compares the current control output value Iout* and a carrier wave and thereby generates a PWM signal (S5). The PWM controller 7 outputs a suitable corresponding PWM signal to each of the switching elements 10a through 10f, based on the previously-detected stop position of the rotor 13 (S6). At this time, the PWM controller 7 generates PWM signals so that currents flow in all of the armature windings 11 of the three phases U, V and W of the three-phase brushless motor 5. The inverter circuit unit 4 is operated according to the PWM signals so that the rotor 13 starts rotating.

Then, as shown in FIG. 5(B), the PWM controller 7 appropriately detects each angular position of the rotor 13 according to a timer signal set inside the microprocessor 6 or a signal supplied from outside, and outputs a PWM signal to each of the switching elements 10a through 10f corresponding to pre-set switching patterns, based on its detected value (S11 through S17).

After the elapse of a predetermined time has been confirmed by a timer or the like subsequently, the PWM controller 7 performs switching between a sequence (first sequence) for generating pulse signals used to allow currents to flow in all of the armature windings 11 of the three phases U, V and W of the three-phase brushless motor 5 and a sequence (second sequence) for generating pulse signals used to allow currents to flow in the armature windings 11 of the two phases U and V, V and W or W and U of the three-phase brushless motor 5 to thereby increase the number of revolutions to a desired number of revolutions (S11 through S13 and S18 through S20). In particular, the process of Step S13 is executed by the microprocessor 6 as the function of a sequence switching means at the startup. Incidentally, the first sequence and second sequence are stored and held in the corresponding memory M in advance.

Thus, the present embodiment is provided with the control means, which is capable of switching between the sequence (first sequence) for generating the pulse signals for causing the currents to flow in all of the armature windings 11 of the three phases U, V and W of the three-phase brushless motor 5 and the sequence (second sequence) for generating the pulse signals for allowing the currents to flow in the armature windings 11 of the two phases U and V, V and W, or W and U within the interrupt process including the process for detecting each angular position of the rotor 13.

Figure 6A:
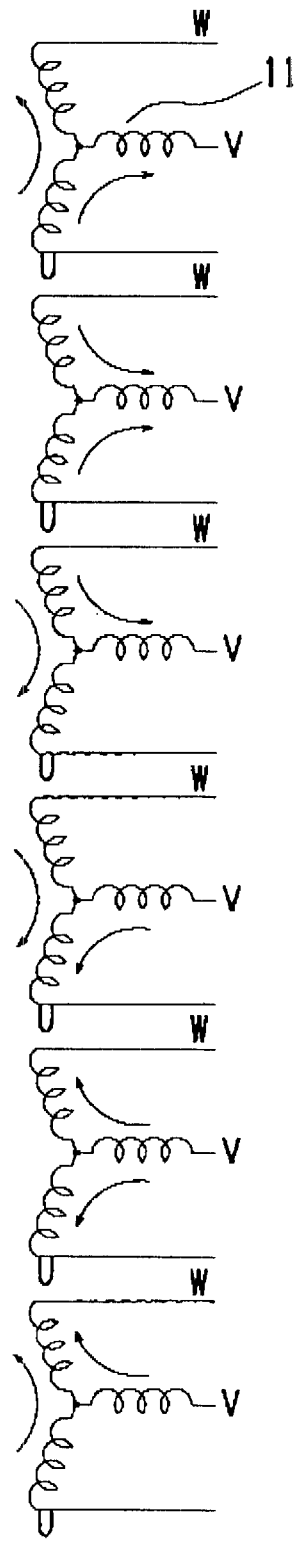
FIG. 6(A) is an explanatory view of current patterns illustrative of 6-step 180° energized drive examples with respect to three phases.
Figure 6B:
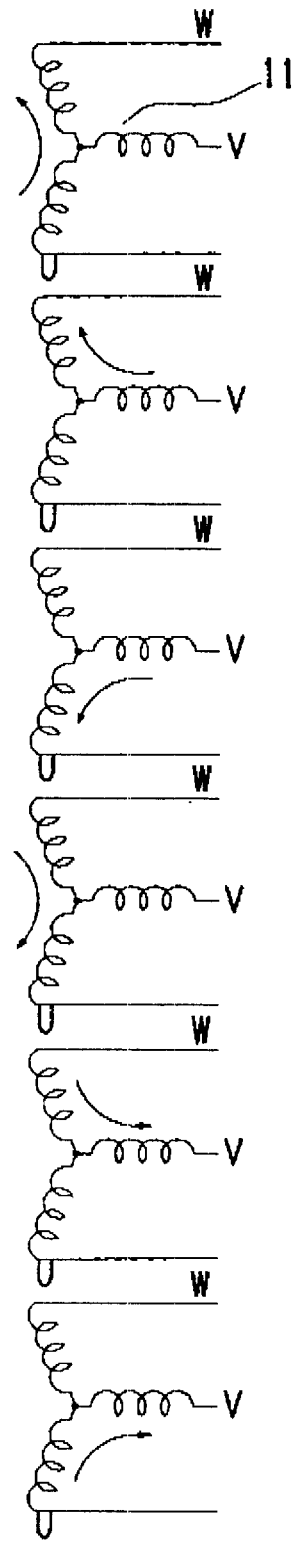
FIG. 6(B) is an explanatory view of current patterns illustrative of 6-step 120° energized drive examples with respect to two phases.

FIG. 6(A) shows 6-step 180° energized drive current patterns as an example in which currents flow in all of the armature windings 11 of the three phases U, V and W of the three-phase brushless motor 5. FIG. 6(B) shows 6-step 120° energized drive current patterns as an example in which currents flow in the armature windings 11 of the two phases U and V, V and W or W and U or the three-phase brushless motor 5.

The present embodiment includes the sequence (first sequence) for generating the pulse signals for causing the currents to flow in all of the armature windings 11 of the phases U, V and W of the three-phase brushless motor 5 and the sequence (second sequence) for generating the pulse signals for causing the currents to flow in the armature windings 11 of the two phases U and V, V and W or W and U, both of which are stored and held in the corresponding memory M and are switchable during the same interrupt process. When the motor-driven blower 1 (three-phase brushless motor 5) is started up, the first sequence for causing the currents to flow in all the armature windings 11 of the three phases U, V and W is first carried out. Subsequently, the sequence is changed to execute the second sequence for causing the currents to flow in the armature windings 11 of the two phases U and V, V and W or W and U.

According to the startup method with such sequence switching, an inrush current that flows upon startup of the motor-driven blower 1, can be reduced, an electrical load on each electronic part to be used can be lightened, and a high reliable product can be implemented. With its implementation, the electronic parts can be reduced in cost and brought into less size and weight too. Since a period in which terminals of the three-phase brushless motor 5 are in an open state, exists under the drive control based on the second sequence, and dead band control becomes unnecessary, it becomes easy to perform such control. Further, since the sequence is switched within the same interrupt process when the motor-driven blower 1 is rotatably driven, there is no need to set a new interrupt process, and software and a circuit configuration are not complicated either. It is also possible to save the capacity of each memory M.

Further, the armature current detecting means 16 and the inverter circuit current detecting means 17 detect a current that flows in each of the armature windings 11. When the current detected value exceeds a pre-set overcurrent detected value, the rotation of the three-phase brushless motor 5 is brought to a halt. It is thus possible to improve the safety of a product.

During the interrupt process including the first sequence for generating the pulse signals for causing the currents to flow in the armature windings 11 of the three phases U, V and W of the three-phase brushless motor 5 and the second sequence for generating the pulse signals for allowing the currents to flow in the armature windings 11 of the two phases U and V, V and W or W and U, a process for discriminating each rotational or angular position of the rotor 13 is carried out at a pre-stage thereof as shown in FIG. 5(B), whereby switching between the first sequence and the second sequence can be performed according to the latest rotational position information.

In this embodiment, the microprocessor 6, as described above, generates the interrupt signal in the preset period or starts interrupt processing in response to the interrupt signal supplied from the outside with such the external interrupt signal as the trigger. The timing for the interrupt processing may have various timing. For instance, the interrupt processing may be started based on a zero-cross point of voltage wave generated in the armature windings 11 if the voltage wave generated in the armature windings 11 are utilized for detection of each angular position of the rotor 13.

As described above, a high-reliable switching process can be realized.

FIG. 7 shows signals outputted from three hole ICs and a state in which interrupt processes are being generated according to the edges of the output signals of the hole ICs when the hole ICs are used as the rotor position detecting means 15 and the three hole ICs are installed in the stator 14 at intervals of electrical angles 120°. According to the present method, when the rotor 13 starts rotating, the interrupt processes are automatically started every electrical angles of 60°. Since the microprocessor 6 needs not create interrupt signals by the timer or the like, the present interrupt processes are simple in setting. Further, since the intervals at which the interrupt processes are produced, become short with an increase in rotational speed, it is easily feasible to suddenly raise the degree of an increase in pulse width at the start by execution of the process of increasing pulse widths within the interrupt processes.

When the sequence (first sequence) for generating such PWM signals as to cause the currents to flow in the armature windings 11 of the three phases U, V and W of the three-phase brushless motor 5 is changed or switched over to the sequence (second sequence) for generating such PWM signals as to cause the currents to flow in the armature windings 11 of the two phases U and V, V and W or W and U, duty Db of the first or initial PWM signal generated by the second sequence is set smaller than or equal to the final duty Da generated by the first sequence (Da≧Db), so that a peak current value flowing at its switching can be hold or restrained low. The duty indicates an on time/(on time+off time) of a PWM pulse. As means for implementing it, for example, the frequency of the carrier wave at sequence switching is kept constant, and the final current control output value IoutA* in the first sequence and the initial current control output value IoutB* at the switching to the second sequence may be stored in the corresponding memory M in advance.

[Electric Vacuum Cleaner]

Figure 8:
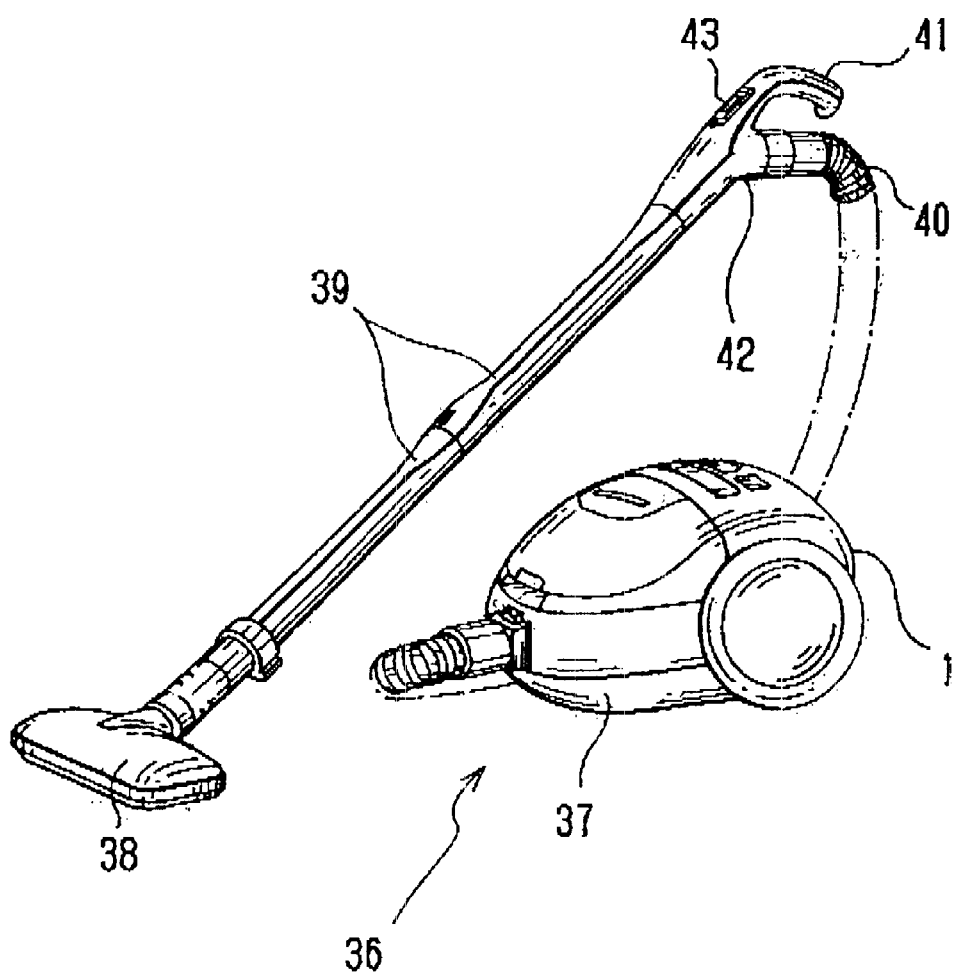
FIG. 8 is a perspective view illustrating an external configuration of an electric vacuum-cleaner.

The motor-driven blower 1 having the configuration referred to above can be mounted on an electric vacuum cleaner. FIG. 8 is a perspective view showing an external configuration of an electric vacuum cleaner 36. The present electric vacuum cleaner 36 has a configuration wherein a hose 40 to which a two-division configured extension pipe 39 having a leading end portion to which a suction or inlet body 38 is detachably fit, is detachably connected, is detachably mounted to a housing 37 which constitutes a base of the electric vacuum cleaner 36.

A motor-driven blower 1 comprising a three-phase brushless motor 5, an air blower 19, etc. is built in the housing 37. The hose 40 is connected to the housing 37 in such a manner that a base end thereof communicates with the suction side of the motor-driven blower 1 through an unillustrated dust chamber. A hand operation unit or control 42 having such a form as to branch from the hose 40 backward is provided at the leading end or tip of the hose 40. In the hand control 42, a free end portion of the leading end thereof that branches from the house 40 backward, serves as a grip or grip portion 41, and a control button 43 used as the external instruction unit 21 is provided at a position where it can be operated with the thumb of an operator who grasps the grip 41. The control button 43 shares a power switch for the motor-driven blower 1 and is configured so as to be capable of selecting and setting a plurality of types of operation modes for respectively bringing the motor-driven blower 1 to driven states different from one another. Namely, the control button 43 switches the operation mode to four stages of "stop", "low", "medium" and "high", for example. Further, the two-division configured extension pipe 39 having the tip or leading end to which the inlet body 38 is detachably mounted, is detachably mounted to the hand control 42.

Since the electric vacuum cleaner 36 is mostly used while being moved along the floor or held by hand, the present embodiment is carried out and an inrush current that flows upon startup of the motor-driven blower 1, is reduced, whereby an electrical load on each circuit part can be lightened and parts low in rank such as the maximum rated current can be used. Therefore, a size and weight reduction can be realized and the effect brought about by the present embodiment is great in particular.

The electric vacuum cleaner 36 needs to increase the rotational speed of the motor-driven blower 1 to about 50000 rpm to about 80000 rpm in about 1 to 3 seconds as a startup time as an electric vacuum cleaner expected to bring about high performance. The motor-driven blower 1 for such an electric vacuum cleaner 36 is so effective at triggering the edge of a signal detected by the corresponding rotor position detecting means 15 to thereby perform each interrupt processing and increasing a pulse width of a PWM signal during the interrupt processing. That is to say, according to this method, when the rotor 13 starts to rotate, each interrupt processing is automatically started, and the interval of occurrence of the interrupt processes varies with the high or low rotational speed. Namely, when the rotational speed at the start is low, the time interval required to cause each interrupt processing is long. When the rotational speed is high, the interval of occurrence of the interrupt processes becomes short. Thus, when the inrush current at the startup is apt to increase upon execution of the process of increasing a pulse width within each interrupt process, it is possible to automatically suppress the inrush current with the slow degree of increase in pulse width. Further, the degree of the increase in pulse width is automatically accelerated since the peak of the inrush current passes over and starts to fall. It is thus possible to increase the rotational speed to high rotational speeds ranging from 50000 rpm to 80000 rpm in a short period of time equivalent to a startup time of about 1 to 3 seconds.

FIG. 9 is a timing chart showing the relationship between the average rotational speed of the motor-driven blower 1 and timings provided to switch the sequence from a first sequence to a second sequence. The timings provided to switch the first sequence for generating pulse signals for causing currents to flow in the armature windings 11 of the three phases of the three-phase brushless motor 5 in the electric vacuum cleaner 36 to the second sequence for generating pulse signals for causing currents to flow in the armature windings 11 of the two phases U and V, V and W or W and U will be described based on FIG. 9.

When the control button 43 selects the operation modes such as "low", "medium" and "high", the motor-driven blower 1 starts rotating. The number of revolutions (rotational speed) settles into being substantially constant according to a load state at this time. Since the load on a fan changes according to the state of a floor or the like and varies even by the manner of collection of dust in a dust-collection filter during actual cleaning, the rotational speed varies. Therefore, the variations in such external factors are added in advance and the average number of revolutions in each operation mode is grasped. As to the average numbers of revolutions, the average numbers of revolutions in the respective operation modes of "low", "medium" and "high" are illustrated in FIG. 9 by way of example.

The microprocessor 6 of the PWM controller 7 changes the sequence from the first sequence to the second sequence in association with the respective operation modes of the electric vacuum cleaner 36 before the number of revolutions reaches the average numbers of revolutions illustrated in FIG. 9 in the respective modes. Timings provided to change from the first sequence to the second sequence are represented as "1→2" in the respective operation modes of "medium","low", "medium" and "high" in FIG. 9. Namely, the timings provided to change from the first sequence to the second sequence may be essentially set before the rotational speed of the motor-driven blower 1 reaches a predetermined rotational speed upon the commencement of startup. However, when the rotational speed is simply set to the predetermined rotational speed, the predetermined rotational speed varies according to the magnitude of a load and the rotational speed is not necessarily kept constant. Therefore, the average numbers of revolutions with the variations in external factors are used. The second sequence for generating the pulse signals for causing the currents to flow in the armature windings 11 of the two phases U and V, V and W or W and U includes a period in which each terminal of the three-phase brushless motor 5 is in an open state, and needs not perform burdensome settings such as dead band control or the like. The motor-driven blower 1 of the electric vacuum cleaner 36 is particularly useful in an application in which the required average number of revolutions is several ten thousands of rpm. Further, since the 6-step 120° energized drive employed in the method based on the second sequence makes it possible to easily perform rotational control by use of simple position detecting means and provides less torque pulsation, the switching to the 6-step 120° energized drive before the number of revolutions reaches the average number or revolutions in each operation mode brings about the effect of reducing vibrations based on the torque pulsation.

Since the fan load changes according to the state of the floor or the like and varies depending on the manner of collection of dust in the dust-collection filter during actual cleaning as described above, the rotational speed varies. Accordingly, the degree of a rise in rotational speed at the actual use of the electric vacuum cleaner 36 might be greater than the degree of a rise in rotational speed at the time that the rotational speed reaches the pre-estimated average number of revolutions. The time required to generate a pulse in the first sequence, which elapses until the number of revolutions reaches the average number of revolutions at the startup of the motor-driven blower 1 of the electric vacuum cleaner 36, is represented as Tm seconds.

The time required to generate a pulse in the second sequence, which elapses until the number of revolutions reaches the average number of revolutions at the startup of the motor-driven blower 1 of the electric vacuum cleaner 36, is represented as Tn seconds.

Thus, it was then confirmed that no particular problem arose even in the use of the electric vacuum cleaner 36 under actual cleaning environments by setting the two as Tm<Tn according to the degree of the rise in the rotational speed which is greater than the degree of the rise in rotational speed at the time that the number of revolutions reaches the pre-estimated average number of revolutions. In the case of, for example, an electric vacuum cleaner in which the number of revolutions reaches the average number of revolutions in 1 to 3 seconds, the value of Z is stored in the corresponding memory M or the like in advance in FIG. 5 so that the sequence changes from the first sequence to the second sequence within 500 msec (=Tm).

FIG. 10 is a timing chart showing the relationship between the average or mean input power of the motor-driven blower 1 and timings provided to change from a first sequence to a second sequence. As another embodiment, the mean input power of the motor-driven blower 1 in each operation mode, of the electric vacuum cleaner 36 may be used as an alternative to the average number of revolutions as each timing provided to change the sequence from the first sequence to the second sequence. Namely, as shown in FIG. 10, the microprocessor 6 of the PWM controller 7 switches the sequence from the first sequence to the second sequence in association with each operation mode of the electric vacuum cleaner 36 before the input power reaches average input power illustrated in FIG. 11 by way of example in each operation mode. Timings provided to change the sequences from the first sequence to the second sequence respectively are represented as "1→2" in the respective operation modes of "medium", "low", "medium" and "high" in FIG. 10.

Even in the case of the average input power, the average input power in the respective operation modes may be grasped in advance plus variations in external factor in a manner similar to the average number or revolutions.

Obviously, numerous modifications and variations of the present invention are possible in light of the above teachings. It is therefore to be understood that within the scope of the appended claims, the invention may be practiced otherwise than as specifically described herein.

What is claimed is:

1. A drive control circuit of a three-phase brushless motor, comprising:

means which generates a pulse signal, based on a detected signal of rotational position detecting means detecting each rotational position of the three-phase brushless motor to thereby control an inverter circuit which drives the three-phase brushless motor;

memory which stores therein a first sequence for generating pulse signals for causing currents to flow in armature windings of three phases of the three-phase brushless motor, and a second sequence for generating pulse signals for causing currents to flow in the armature windings of two phases of the three-phase brushless motor; and startup sequence switching means which generates pulse signals according to the first sequence to control the inverter circuit when the three-phase brushless motor is started up, and thereafter performs switching to the second sequence to generate pulse signals to thereby control the inverter circuit, wherein the sequence switching means perform switching between the first sequence and the second sequence during an interrupt process including a process for detecting each rotational position of the three-phase brushless motor, and wherein the process for detecting the rotational position of the three-phase brushless motor is carried out at a pre-stage of the interrupt process.

2. A drive control circuit of a three-phase brushless motor, comprising:

means which generates a pulse signal, based on a detected signal of rotational position detecting means detecting each rotational position of the three-phase brushless motor to thereby control an inverter circuit which drives the three-phase brushless motor;

memory which stores therein a first sequence for generating pulse signals for causing currents to flow in armature windings of three phases of the three-phase brushless motor, and a second sequence for generating pulse signals for causing currents to flow in the armature windings of two phases of the three-phase brushless motor; and startup sequence switching means which generates pulse signals according to the first sequence to control the inverter circuit when the three-phase brushless motor is started up, and thereafter performs switching to the second sequence to generate pulse signals to thereby control the inverter circuit, wherein the pulse signals are PWM signals, and when the first sequence is switched to the second sequence, the sequence switching means satisfies a relationship of $Da \geq Db$ in which duty Db of the PWM signal generated according to the second sequence is less than or equal to duty Da of the PWM signal generated according to the first sequence.

3. A motor-driven blower, comprising:

a three-phase brushless motor;

an air blower coupled to the three-phase brushless motor;

rotational position detecting means which detects each rotational position of the three-phase brushless motor;

a drive control circuit which generates each of pulse signals, based on a detected signal obtained from the rotational position detecting means, the drive control circuit comprising:

memory which stores therein a first sequence for generating pulse signals for causing currents to flow in armature windings of three phases of the three-phase brushless motor, and a second sequence for generating pulse signals for causing currents to flow in the armature windings of two phases of the three-phase brushless motor; and startup sequence switching means which generates pulse signals according to the first sequence to control an inverter circuit when the three-phase brushless motor is started up, and thereafter performs switching to the second sequence to generate pulse signals thereby controlling the inverter circuit; and the inverter circuit which drives the three-phase brushless motor based on the pulse signals, wherein the sequence switching means performs switching between the first sequence and the second sequence during an interrupt process including a process for detecting each rotational position of the three-phase brushless motor, and wherein the process for detecting the rotational position of the three-phase brushless motor is carried out at a pre-stage of the interrupt process.

4. A motor-driven blower, comprising:

a three-phase brushless motor;

an air blower coupled to the three-phase brushless motor;

rotational position detecting means which detects each rotational position of the three-phase brushless motor;

a drive control circuit which generates each of pulse signals, based on a detected signal obtained from the rotational position detecting means, the drive control circuit comprising:

memory which stores therein a first sequence for generating pulse signals for causing currents to flow in armature windings of three phases of the three-phase brushless motor, and a second sequence for generating pulse signals for causing currents to flow in the armature windings of two phases of the three-phase brushless motor; and startup sequence switching means which generates pulse signals according to the first sequence to control an inverter circuit when the three-phase brushless motor is started up, and thereafter performs switching to the second sequence to generate pulse signals thereby controlling the inverter circuit; and the inverter circuit which drives the three-phase brushless motor based on the pulse signals, wherein the pulse signals are PWM signals, and when the first sequence is switched to the second sequence, the sequence switching means satisfies a relationship of $Da \geq Db$ in which duty Db of the PWM signal generated according to the second sequence is less than or equal to duty Da or the PWM signal generated according to the first sequence.

5. An electric vacuum cleaner, comprising:

a housing; and a motor-driven blower held in the housing, comprising:

a three-phase brushless motor;

an air blower coupled to the three-phase brushless motor;

rotational position detecting means which detects each rotational position of the three-phase brushless motor;

a drive control circuit which generates each of pulse signals, based on a detected signal obtained from the rotational position detecting means, the drive control circuit comprising:

memory which stores therein a first sequence for generating pulse signals for causing currents to flow in armature windings of three phases of the three-phase brushless motor, and a second sequence for generating pulse signals for causing currents to flow in the armature windings of two phases of the three-phase brushless motor; and startup sequence switching means which generates pulse signals according to the first sequence to control an inverter circuit when the three-phase brushless motor is started up, and thereafter performs switching to the second sequence to generate pulse signals thereby controlling the inverter circuit; and the inverter circuit which drives the three-phase brushless motor based on the pulse signals, wherein the drive control circuit switches the first sequence to the second sequence before an average number of revolutions of the motor-driven blower in each operation mode is reached.

6. An electric vacuum cleaner, comprising:

a housing: and a motor-driven blower held in the housing, comprising:
a three-phase brushless motor;
an air blower coupled to the three-phase brushless motor;
rotational position detecting means which detects each rotational position of the three-phase brushless motor;

a drive control circuit which generates each of pulse signals, based on a detected signal obtained from the rotational position detecting means, the drive control circuit comprising:

memory which stores therein a first sequence for generating pulse signals for causing currents to flow in armature windings of three phases of the three-phase brushless motor, and a second sequence for generating pulse signals for causing currents to flow in the armature windings of two phases of the three-phase brushless motor; and startup sequence switching means which generates pulse signals according to the first sequence to control an inverter circuit when the three-phase brushless motor is started up, and thereafter performs switching to the second sequence to generate pulse signals thereby controlling the inverter circuit; and the inverter circuit which drives the three-phase brushless motor based on the pulse signals, wherein the drive control circuit switches the first sequence to the second sequence before average input power of the motor-driven blower in each operation mode is reached.

* * * * *